US008322395B2

(12) United States Patent
Hurst

(10) Patent No.: US 8,322,395 B2
(45) Date of Patent: Dec. 4, 2012

(54) APPARATUS AND METHOD FOR CLEAN REMOVING LABELS FROM CONTAINERS

(76) Inventor: Richard H. Hurst, Vero Beach, FL (US)

(*) Notice: Subject to any disclaimer, the term of this patent is extended or adjusted under 35 U.S.C. 154(b) by 315 days.

(21) Appl. No.: 12/772,135

(22) Filed: Apr. 30, 2010

(65) Prior Publication Data

US 2010/0276083 A1 Nov. 4, 2010

Related U.S. Application Data

(60) Provisional application No. 61/174,202, filed on Apr. 30, 2009.

(51) Int. Cl.
*B32B 38/10* (2006.01)

(52) U.S. Cl. ........ 156/762; 156/717; 156/921; 156/936; 30/169; 30/172; 15/93.1; 15/236.01; 15/236.06

(58) Field of Classification Search .................. 156/717, 156/762, 921, 935, 936; 30/169, 172; 15/93.1, 15/236.01, 236.05, 236.06
See application file for complete search history.

(56) References Cited

U.S. PATENT DOCUMENTS 4,122,734 A 10/1978 Hurst
4,325,775 A * 4/1982 Moeller ........................ 156/750
5,152,865 A 10/1992 Hurst
5,372,672 A * 12/1994 Seifert et al. .................. 156/750
5,373,618 A * 12/1994 Doyle et al. ................. 29/426.3
5,885,401 A * 3/1999 Eiban ............................ 156/709
6,199,615 B1 * 3/2001 Klarl ............................. 156/750

FOREIGN PATENT DOCUMENTS

DE 3504303 A * 8/1986
DE 19701892 A1 * 9/1998

OTHER PUBLICATIONS

Hurst Corporation, "Safe Label Removal From Syringes and Cartridges".
Hurst Corporation, "DL Series Label Removing Machine".

* cited by examiner

*Primary Examiner* — Mark A Osele
(74) *Attorney, Agent, or Firm* — Monty Simmons; Simmons Patents

(57) ABSTRACT

An improved semi-automatic Label Stripping Machine for detaching labels from a round container is disclosed. The container is placed between a rotatable idler and a rotatable platform. The container is rotated on its central vertical axis by rotating the platform. A plurality of peeler assemblies are brought in contact with the label and are moved down the outside surface of the container there by spirally striping off the label. The apparatus further comprises a guide that provides provide improved safety and a self-cleaning feature.

14 Claims, 6 Drawing Sheets

APPARATUS AND METHOD FOR CLEAN REMOVING LABELS FROM CONTAINERS

CLAIM TO PRIORITY

This application claims priority to provisional 61/174,202 filed on Apr. 30, 2009 which is incorporated by this reference for all that it discloses.

TECHNICAL FIELD OF THE INVENTION

The present invention relates to an improved apparatus and method for removing/stripping labels which are attached by adhesive to cylindrical shaped containers. More particularly, the present invention is related to an improved semi-automatic label removing machine which removes both the label and the adhesive on relatively long containers as an integral unit without forming particulate.

BACKGROUND OF THE INVENTION

Heretofore printed labels which were placed on cylindrical glass containers were made from paper, foil and plastic. The paper labels are most commonly varnished, clay coated fiber paper stock. When such paper labels are removed by prior art label stripping machines of the type set forth in a commonly held U.S. Pat. No. 4,122,734 the label was spirally cut and removed creating large amounts of dust and particulate which clogged the machine and affected its operability as well as created a pollution hazard. Even though plastic and foil labels do not create clay dust, they still produce a large amount of particulate which also produces problems for cleanliness of the machine and its environment.

Additionally, the razor blades used in such label stripper machines is known to produce a spiral strip when cutting and stripping a label from a container. Not only was such label not cleanly removed but some label adhesive redeposited itself on different parts of the label stripper apparatus including the container which was being stripped. Thus, the prior art label strippers, while accomplishing the task of removing different types of adhesive backed labels, generated a post-cleaning operation to remove adhesive particles and parts of adhesive labels from the container as well as unremoved adhesive from the container.

Thus, heretofore, the spiral stripping motion of paper labels leaves a substantial adhesive residue on the bottles. Not only is there some adhesive left on the bottles but there is adhesive on the particulate that becomes statically charged and reattaches itself not only to the bottles but to the machinery which requires additional cleaning of the machine and requires post-stripping cleaning of the bottles.

Commonly held U.S. Pat. No. 5,152,865, issued to Richard Hurst, teaches an apparatus and method of removing an adhesive backed label from a cylindrical container. Such an apparatus and system works well for its intended purposes, however, improvements have been developed that (a) improve the time required to remove a label (i.e. faster); (b) provide improved safety; (c) provide a self-cleaning features; and (b) that better remove labels from cylindrical containers that may have more than one label as well as different sections having different diameters.

SUMMARY OF THE INVENTIONS

Some of the objects and advantages of the invention will now be set forth in the following description, while other objects and advantages of the invention may be obvious from the description, or may be learned through practice of the invention.

The present invention an improved apparatus essentially eliminates the adhesive residue left on the bottles and at the same time substantially eliminates all of the particulate and removes the adhesive coated label as an integral unit so there is no particulate other than the unit label which can easily be removed.

It is a primary object of the present invention to provide a novel label removing apparatus for removing labels faster and for removing multiple labels perhaps on sections of a cylindrical container having different diameters.

It is another principal object of the present invention to provide a novel label removing apparatus which can be embodied in an automatic or semi-automatic machine.

It is another primary object of the present invention to provide an improved label removing apparatus which comprising a plurality of adjustable peeler-assemblies that can be adjusted to remove different types of labels from different size bottles without generating particulate.

It is another principal object of the present invention to provide an improved label stripping apparatus comprising a plurality of blade-interfaces which peels the adhesive back label from a container having a plurality of sections of different sizes.

It is another object of the present invention to provide a universal label removing apparatus which is adapted to remove labels from different sizes of cylindrical glass containers such as bottles, vials, test tubes, syringes and ampules.

It is another object of the present invention that comprises a plurality of peeler assemblies comprising a peeler wherein the peeler assemblies are adjustable to provide for a peeler having a z-axis tile as well as the prior art horizontal tilt.

It is yet another general object of the invention to provide the features described above with improved safety for operators and maintenance personnel.

It is a general object of the present invention to remove different types of adhesive backed labels by compressing the label in the vertical direction while expanding the horizontal dimension.

According to these and other objects of the present invention there is provided a novel method and apparatus for clean removing adhesive backed labels from cylindrical containers which comprises the steps of mounting the container at least one adhesive backed label thereon on a rotating platform then engaging a plurality of tilted peelers (each titled peeler associated with a peeler-interface) between the adhesive and the glass container and moving the tilted peelers vertically so as to peel the adhesive backed label from the container by forcing the tilted peeler between the adhesive and the container to remove the label and the adhesive as an integral unit which forms as an adhesive side out skirt that is larger in diameter than the original label. The peeler interface is adjustable to provide an associated peeler with a z-axis tilt for a faster and improved peeling process. A peeler guide is also provided to provide safety features as well as provide an alignment guide for setting the z-axis tilt. The novel method is substantially faster than prior art machines and substantially reduces the amount of remaining residue which can be easily removed by vacuum or by hand if required.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
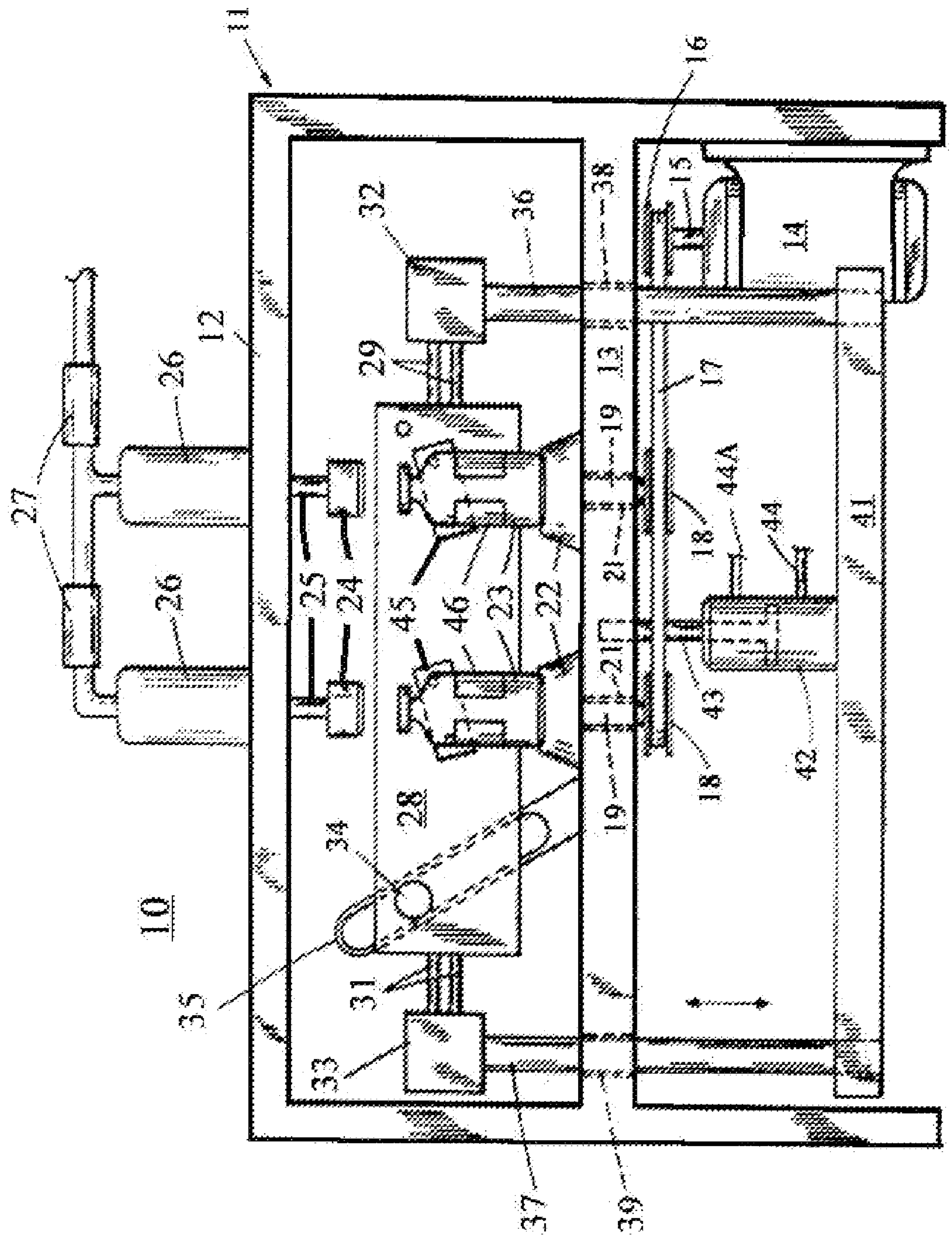
FIG. 1 is a front partial section view of a prior art label removing machine.

Repeat use of reference characters throughout the present specification and appended drawings is intended to represent the same or analogous features or elements of the present technology.

DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

Referring now to FIG. 1, one exemplary embodiment of the invention presented in commonly owned U.S. Pat. No. 5,152,865 is presented (incorporated by this reference for all that it discloses). Some of the improvements presented in this application are implemented via a modified version of the machine depicted in FIG. 1. FIG. 1 shows a front elevation in partial section of a label removing machine 10 having a box shaped frame 11. The frame 11 has a top cross member 12 and a center cross member 13. A variable speed motor 14 is shown having a shaft 15 coupled to a drive pulley 16 which drives a belt 17 coupled to a plurality of driven pulleys 18. Each of the driven pulleys 18 is coupled to a shaft 19 rotatably mounted in bearing means 21 which are mounted in the center cross member 13. Rotating platforms 22 are attached by set screws (not shown) to the rotatable shafts 19 and are adapted to receive and center cylindrical containers 23 thereon. Rotatable idlers 24 are mounted on piston shafts 25 of clamp cylinders 26. A source of air (not shown) is coupled to air lines 27 which permits the pistons in air cylinders 26 to be actuated in a manner which clamps the tops of containers 23 in the rotatable idlers 24. Once the containers 23 are clamped, the variable speed motor 14 may be activated so as to rotate platforms 22 and thereby rotating the containers 23 and the idlers 24.

Figure 2:
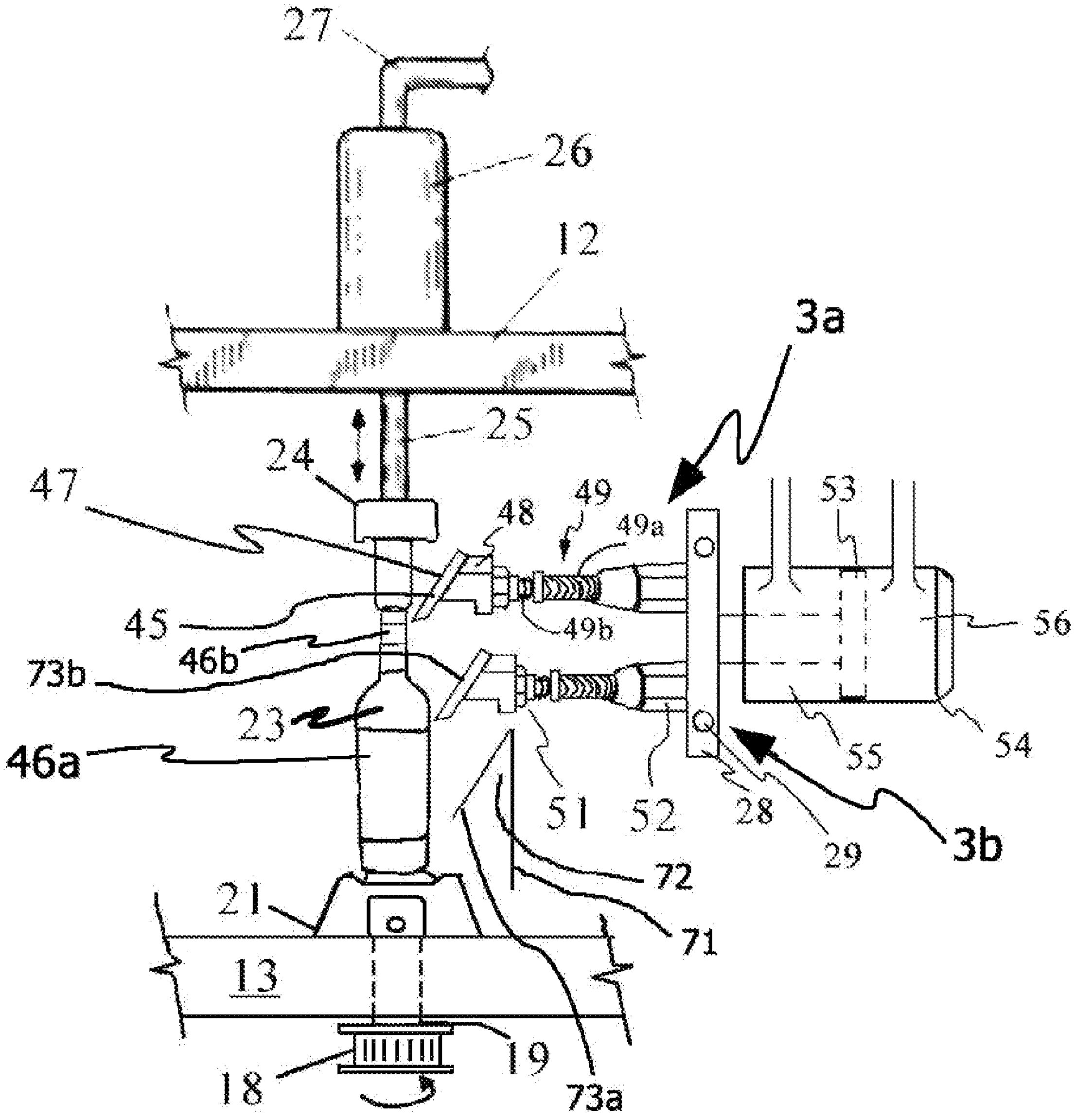
FIG. 2 is an enlarged elevation in side view of the preferred improved embodiment label removing machine shown in FIG. 1 comprising a plurality of peelers assemblies.

For the prior art version of the apparatus, Peeler assembly mount 28 is configured for being associated with a single peeler assembly for each rotating platform 22. The peeler assemblies are shown supported by a pair of cylindrical stub shafts 29 and 31 which are fixed in the peeler assembly mount 28 and slidably mounted in the cross blocks 32 and 33 respectively. In contrast, for one embodiment of the present invention, peeler assembly mount 28 is configured for being associated with a peeler assembly array as depicted in FIG. 2.

For the purposes of this document, a peeler assembly array comprises two or more peeler assemblies. For example, a set of three peeler assemblies, wherein each peeler assembly is associated with a different rotating platform, wherein each peeler assembly is configured to remove a label from a container supported by its respective platform, (as in FIG. 5) represent a peeler assembly array. Similarly, a set of peeler assemblies associated with a single platform and configured to remove a section of a label associated with the same bottle (as in FIG. 6) represents a peeler assembly array. Further, A peeler assembly is said to be associated with a platform is such peeler assembly is configured to remove a label from a container supported by such platform. Two or more peeler assembly arrays form a peeler assembly matrix.

Bearings in the cross blocks 32 and 33, such as sleeve bearings permit the peeler assembly mount 28 to be moved in a horizontal direction by means of a bearing 34 mounted on the peeler assembly mount 28 and co-operable with an inclined cam slot means 35 mounted on the center cross member 13. Thus, when the peeler assembly mount 28 is moved vertically, the bearing 34 is guided in the cam slot 35 so as to impart a horizontal movement of the stub shafts 29 and 31 which are slidably mounted in the cross blocks 32 and 33 respectively.

Cross blocks 32 and 33 are fixed onto and supported by vertically movable shafts 36 and 37. Shafts 36 and 37 are slidably mounted in bearings 38 and 39 mounted in center cross member 13. Vertical support shafts 36 and 37 are also fixed to a transverse lift bar 41 which is adapted to raise and lower the cross blocks 32 and 33 so as to raise and lower the peeler assembly mount 28.

A vertical lift air cylinder 42 is mounted on lift bar 41 and provided with a piston 43 having a shaft fixed and coupled to center cross member 13. Cylinder 42 is provided with an adjustable air supply (not shown) which is coupled to input/output air lines 44, 44A for actuating the air cylinder 42 so as to move the peeler assembly mount 28 vertically up and down.

Referring now to FIG. 2, Peelers 45 are shown tilted at an angle 72 from the horizontal axis and aligned with the partial wrap around labels 46. The preferred tilt angle is between 2 to 7 degrees but other angles of attack may be used. To further describe tilt angle 72, such angle is the angle formed by the intersection a line 73*a*, which is in parallel alignment with peeler face 73*b*, and a line 71 that is in parallel alignment with the face of the item 23 associated with label (46).

Still referring to FIG. 2, an enlarged elevation in side view is presented of a presently preferred embodiment comprising a peeler array comprising a plurality of peeler assemblies associated with one peeler assembly mount 28. More specifically, the peeler array comprises peeler assembly 3*a* and peeler assembly 3*b*. For such embodiment, each peeler assembly comprises peeler 45, peeler interface 48, nut 51, shaft 49, and shaft receiver 52. For the presently preferred embodiment, peeler assembly mount 28 is configured for being associated with two peeler assemblies. It should be noted for this configuration each peeler assembly is in vertical alignment with each other. It should be appreciated that embodiments where one or more peeler assemblies are offset relative to one another (i.e. not in vertical alignment) with overlapping stripping paths fall within the scope of the present invention.

It should be appreciated that for the configuration in FIG. 2, where both peeler assemblies are associated with the same peeler assembly mount 28, both peeler assembly 3*a* and 3*b* are activated at the same time and cannot be individually activated. In one alternative embodiment, each peeler assembly is associated with a dedicated assembly mount 28 and may be individually activated.

Referring now to peeler 45, any number of devices may be used as a peeler 45 such as a mechanically based apparatus such as a blade, an electrically based apparatus such as a LASER, a terminally based apparatus such as a flame, and a chemically based apparatus such as a high energy stream of fluid such as an acid or water (etc.). For the preferred embodiment, peeler 45 is a blade.

As depicted in FIG. 2, each peeler assembly comprises a peeler 45 associated with a peeler interface 48 via screws 47. The peeler interface is associated with threaded and spring loaded shaft 49. The horizontal tilt angle of the peeler interface 48 is preferably manually adjusted and locked at a preferred horizontal tilt angle 72 (described above) by means of nut 51 (such as a lock nut or a jam nut). For the presently preferred embodiment, nut 51 is mechanically associated with shaft 49 via a spring loaded telescoping shaft section 49*b*. Spring loaded telescoping shaft section 49*b* may be mechanically associated to threaded shaft section 49*a* by any commonly known method, or alternatively, may be an integral component of threaded shaft section 49*a*. Shaft 49 is mechanically associated with shaft receiver 52 which is mechanically associated with peeler assembly mount 28.

Peeler assembly mount 28 is mechanically associated with the shaft of cylinder 54. Cylinder 54 has a retractor portion 55 and a drive portion 56 which are coupled to an air supply (not shown). When air is entered into the portion 55 the peeler 45 is retracted a predefined distance and when air is entered into the portion 56 the peeler 45 is engaged against the container 23.

One of ordinary skill in the art will appreciate that cylinder 54 provides an automatic first course adjustment for the horizontal position of peeler 45. A manual second course adjustment for peeler 45 is provided by threaded shaft section 49*a* by manually adjusting how far shaft 49 screws into adjustable shaft receiver 52. As will be described below, adjustable shaft receiver 52 is configured to adjust the Z-axis tilt of the blade. Additionally, an automatic third fine adjustment for peeler is provided by spring loaded telescoping shaft section 49*b* that provides a preload configured to compensate for small variations in container shape.

As already explained hereinbefore the peeler assembly mount 28 which supports air cylinder 54 may be moved horizontally by the cam means 34, 35 and moved vertically by the vertical air lift cylinder 42. In the preferred embodiment mode of operation, the peeler 45 is tilted at an angle between 5 and 10 degrees and slowly brought into vertical engagement with the label 46. Since the label 46 may be made of several different substances such as paper, foil and plastic known as the label stock and provided with different types of rear surface adhesive such as pressure sensitive adhesives, thermo plastic adhesives and gummed adhesives all of which may come in different thicknesses and chemical compositions there is no one angle of tilt for the blade which operates the best for all labels.

FIG. 2 shows two labels, 46*a* and 46*b*, being removed from a single container where each label is associated with a container section having a different size (diameter). For such a task, a first peeler assembly is adjusted so that a first peeler 45 extends out farther than a second peeler 45 for a second peeler assembly. For embodiments where each peeler assembly are associated with a dedicated peeler assembly mount 28 and associated air cylinder 54, peeler assembly 3*a* may be activated first to remove label 46*b* and then both peeler assembly 3*a* and 3*b* may be activated to remove label 46*b*. For such embodiment, any number of commercially available electronic controllers, such as PLCs, may be used to control the peeler assemblies.

One of ordinary skill in the art will appreciate that if faster label removal is desired for a container associated with one label, each peeler assembly may be adjusted to the same distance and be configured to remove a different section of such label. The vertical position of the top most peeler assembly is to start at the top of the label whereas the remaining peeler assemblies will be positioned to remove a lower section of such label. Such peeler assembly array would then be moved down relative to the container until the entire label has been removed.

If a faster label removing performance is desired, it should be appreciated that a larger tilt angle will result in more rapid removal of the label. Similarly higher vertical speeds of the movement of the peeler assembly mount 28 will result in more rapid removal of the labels. Further, the variable speed motor 14 which drives the pulley 18 and determines the rotation of the container or bottle 23 also affects the speed of removal of the labels 46. Since different diameter containers 23 are usually encountered, the variable speed motor may be employed to compensate for the peripheral speed of the different diameter containers. This is to say that large diameter containers will have greater peripheral speeds than vials or syringes which have smaller diameters. Further, it will be understood that the clamps 24 and rotatable mounting platforms 22 are removable from their respective shafts 25 and 19 so as to provide idler clamps and rotatable platforms which center the type of container being inserted into the label removing machine 10. A trial with one or two containers will rapidly determine the maximum speed of rotation of the container and descent of the blade as well as the tilt angle of the blade to provide an optimum removal of the label 46 as an integral unit as will now be explained.

Figure 3:
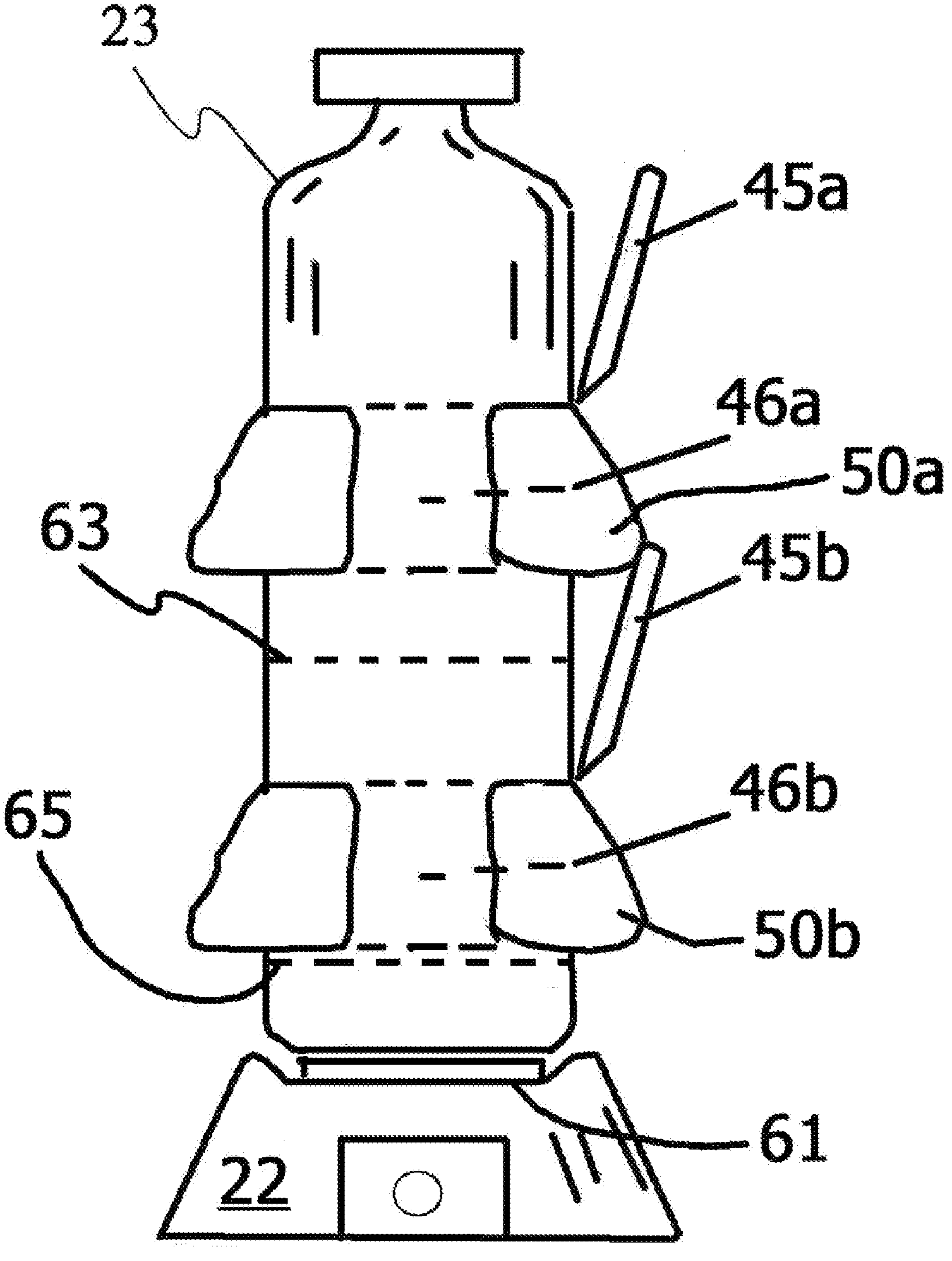
FIG. 3 is another enlarged elevation of a container showing a partial wrap around label being removed by a tilted peeler to produce an integral adhesive side out flared skirt label.

Referring now to FIG. 3, presented is an enlarged elevation view of a container 23 having a partial wrap around label 46 which is half removed by peelers 45*a* and 45*b*. For this embodiment of the inventions, the peeler array contains two peeler assemblies, 45*a* and 45*b* in vertical alignment and extending to the same point from peeler assembly mount 28. For such embodiment, peeler 45*a* starts at the top of label 46 and removes label 46 down to point 63 thereby removing section 46*a* of label 46. Similarly, peeler 46*b* starts at point 63 and moves down from point 63 to the bottom of the label (point 65) thereby removing label section 46*b* of label 46. The platform 22 is shown having a tapered shape so as to accommodate the flared skirt 50 shown being produced in FIG. 5 when a partial wrap around label 46 is being removed. The rotatable platform 22A is also provided with a cushion 61 so as to assist in centering the container 23 as it is clamped by the rotatable idler 24.

Figure 4:
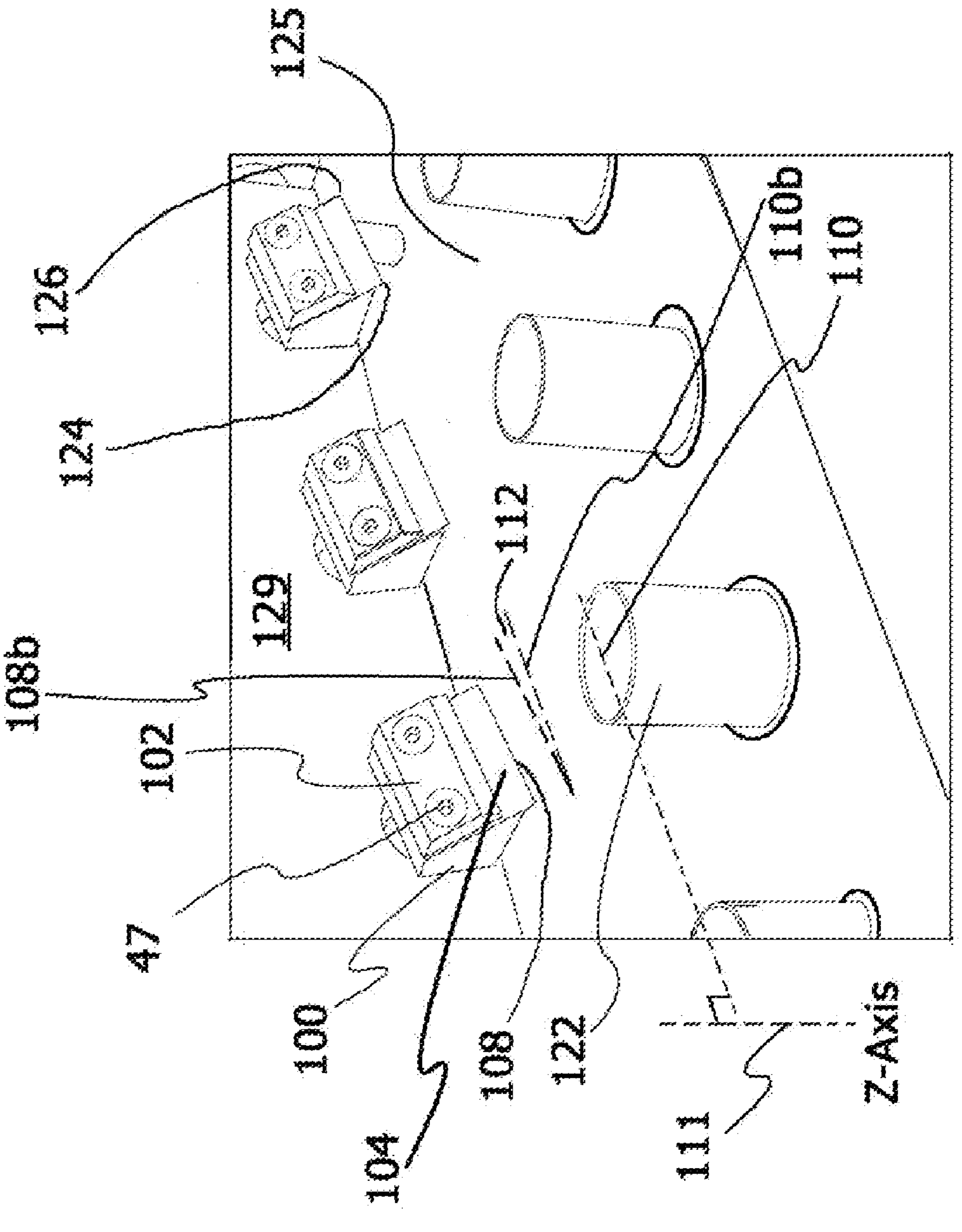
FIG. 4 is a side perspective view of one exemplary embodiment of the present invention showing an set of horizontal blades wherein such blades defines a z-axis tilt angle.

Referring now to FIG. 4, a side perspective view of an alternative embodiment of the invention is presented showing the peeler assembly configured with a z-axis tilt. Before defining the z-axis tilt, a closer look at such peeler assembly is presented. As before, the peeler assembly comprises peeler 104 (45 in FIG. 2), peeler interface 100 (48 in FIG. 2), nut 51, shaft 49, and shaft receiver 52. In prior art system described initially above, neither shaft receiver 52 nor nut 51/shaft 49 were adjustable to provide for a z-axis tilt angle. For the current embodiment of the invention, one of the peeler interface 100 (via nut 51/shaft 49) and the receiver 52 is adjustable to provide for non-zero peeler z-axis tilt angles.

For the present embodiment where the peeler assembly comprises a blade, a peeler blade 104 is secured between peeler interface 100 and pressure plate 102 by screws 47. The edge 108 of blade 104 extends beyond the edge of peeler interface 100 a predefined amount.

The z-axis tilt is now considered. For the purposes of this document, the Z-axis is defined by the plane in alignment with line 111 which is perpendicular to the plane in alignment with line 110 which is in alignment with the plane defined by top surface of platform 122. Restated, line 111 should parallel to the surface of the container associated with the label to be removed. The amount of Z-axis tilt is defined by angle 112 which is shown in FIG. 4 as the measure of the angle formed by line 110*b* and line 108*b*. Line 108*b* is parallel to edge 108 of blade 104 whereas line 110*b* is parallel to line 110 defined by the top of platform 122. Restated, when then peeler assembly is configured to have a non-zero z-axis tilt angle, the left edge (124) of peeler 104 is at a different distance from surface 125 than is the right edge 126 of peeler 104. Such a tilt angle improves the life of blade 104 and can improve the speed of the peeling processing.

The z-axis tilt angle is preferably between 1 and 15 degrees although z-axis tilt angles of up to 45 degrees fall within the scope of the present invention. It should be appreciated that for the present configuration, the peeler assembly not only defines a horizontal tilt angle as described above, it also defines a z-axis tilt angle.

Figure 5:
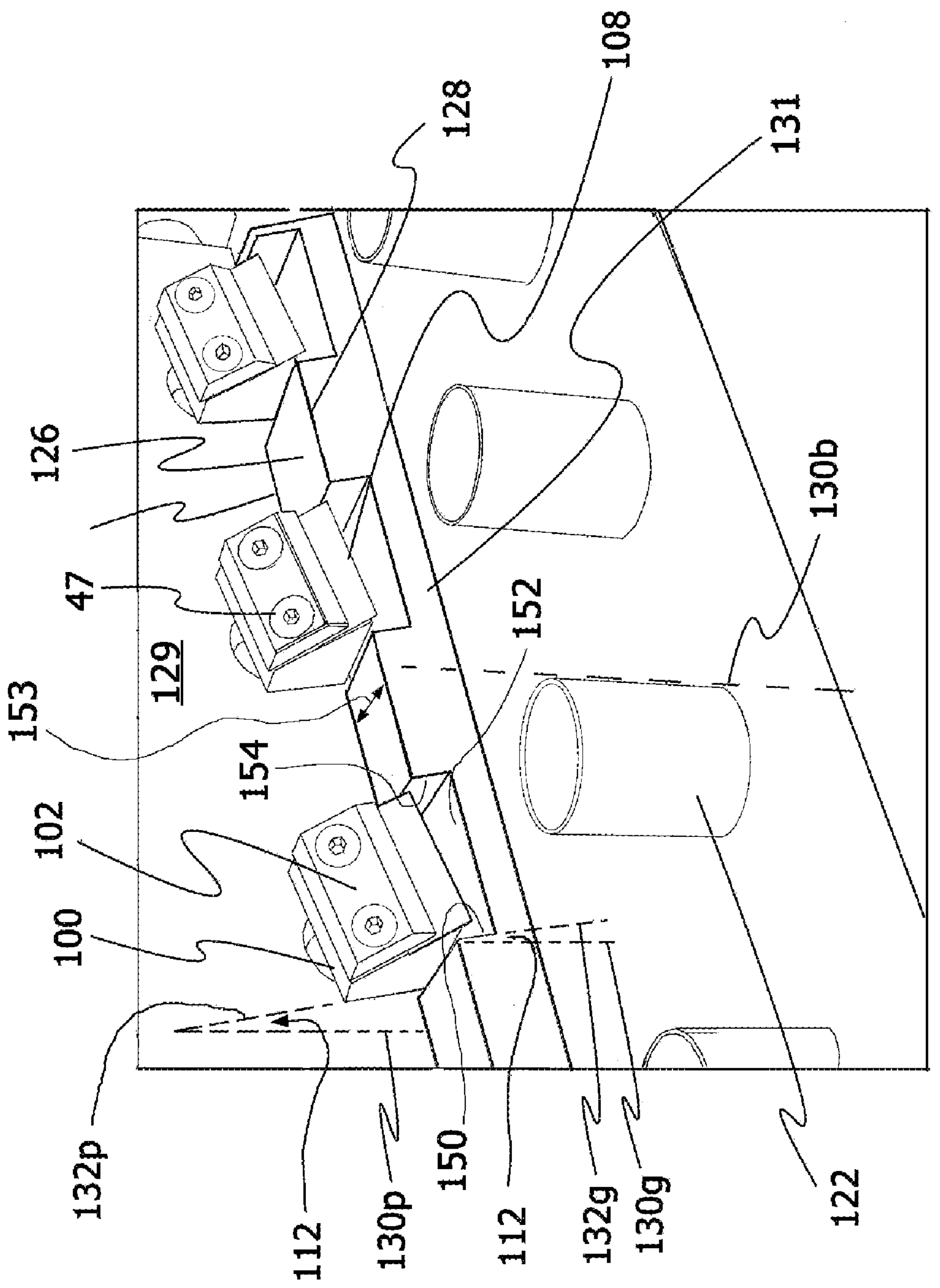
FIG. 5 is a side perspective view of the device depicted in FIG. 7 including a blade guide that at least partially surrounds each of the blades.

Referring now to FIG. 5, another alternative embodiment of the invention is presented wherein the apparatus further comprises a peeler guide 126. For the presently preferred embodiment, the apparatus comprises a plurality of aligned peeler assemblies extending from the left of the apparatus to the right of the apparatus. The peeler guide 126 defines a bar defining a guide width 153 wherein said bar that extends from, and in alignment with, the left most peeler assembly to the right most peeler assembly as presented in FIG. 5. Peeler guide 126 further defines bays at each peeler assembly location within which the peeler assemblies retract when not engaging in a label removing processing. As shown in FIG. 5, when the peeler assembly is not engaged in a label removing process, the front face 131 of peeler guide 126 extends out further from back plate 129 than does the edge 108 of blade 104 so that the blades are recessed relative to the front Face 131. Such a configuration provides at least two benefits: (1) machine operators and maintenance personnel are less likely to cut themselves when performing functions such as cleaning, performing setup operations, and servicing; and (2) the front face 131 of guide 126 will scrape off particulate buildup that may have attached itself to the peeler assemblies.

For yet another embodiment, peeler guide 126 further defines an angle-guide for setting the z-axis tilt angle. As show in FIG. 5, the peeler bay is defined by a left-bay-wall 150 that extends downward from the top surface of the peeler guide a predefined distance to the left side of bay-floor 152. Bay-floor 152 extends from the left-bay-wall 150 to the right-bay-wall 154 and right-bay-wall 154 extends from the bay-floor 152 back to the top surface of the peeler guide thereby defining a slot. For the present embodiment, left-bay-wall 150 extends non-perpendicularly from the top surface of bay-floor 152 thereby defining a guide angle 112. Such guide angle is selected to equal the desired z-axis tilt angle (described above) thereby defining an angle-guide by which an operator may use to set the z-axis tilt angle.

Figure 6:
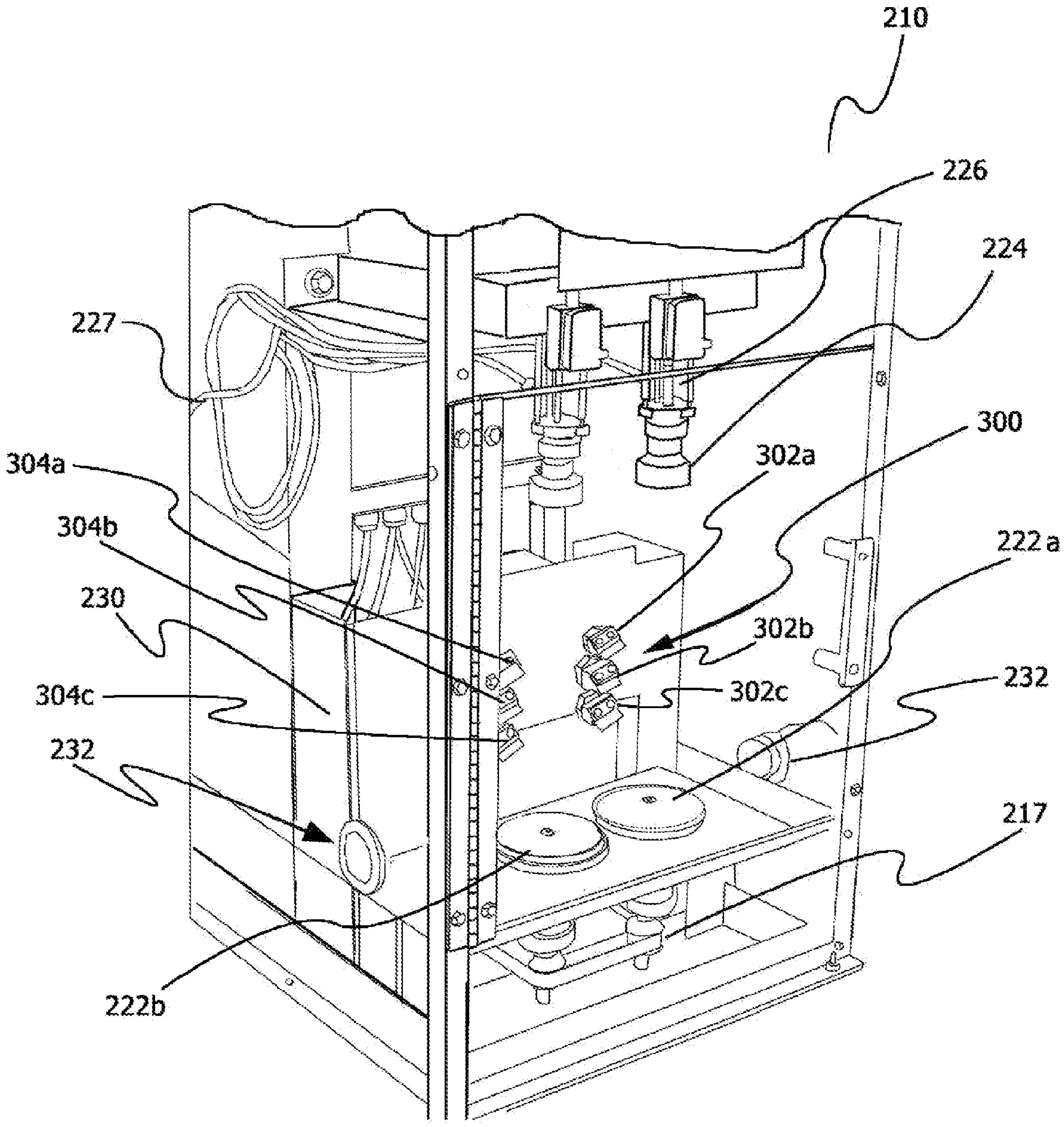
FIG. 6 is a side perspective view of an exemplary embodiment of the invention comprising a plurality of blade arrays defining a blade matrix wherein each blade array comprises a plurality of blades in vertical alignment.

Referring now to FIG. 6, one alternative embodiment of machine 10 depicted in FIG. 1 is presented. For such embodiment, machine 210 comprises the same basic support structure movement structure described for machine 10. As was described for machine 10, a variable speed motor (not shown) drives belt 217 coupled to a plurality of driven pulleys. Each of the driven pulleys is coupled to a shaft which are associated with rotating platforms 222 by any conventional means such as set screws. Platforms 222 are adapted to receive and center cylindrical containers thereon. Rotatable idlers 224 are mounted on piston shafts associated with clamp cylinders 226. A source of air (not shown) is coupled to air lines 227 which permits the pistons in air cylinders 226 to be actuated in a manner which clamps the tops of the containers in the rotatable idlers 224. Once the containers are clamped, the variable speed motor 214 may be activated so as to rotate platforms 222 and thereby rotating the containers and the idlers 224.

For the prior art version of the apparatus, Peeler assembly mount 28 is configured for being associated with a single peeler assembly per platform and is shown supported by a pair of cylindrical stub shafts 29 and 31 which are fixed in the peeler assembly mount 28 and slidably mounted in the cross blocks 32 and 33 respectively. For the present embodiment of the present invention, peeler assembly mount 28 is configured for being associated with a peeler assembly array as depicted in FIG. 2. As depicted in FIG. 6, platforms 222*a* and 222*b* are each associated with a vertically aligned peeler assembly array. For example, platform 222*a* is associated with peeler assemblies 302*a*, 302*b*, and 302*c*. Similarly, platform 222*b* is associated with peeler assemblies 304*a*, 304*b*, and 304*c*. The two peeler assembly arrays form a peeler assembly matrix 300.

It should be appreciated that for the configuration depicted in FIG. 6, the entire matrix is activated simultaneously. Such an embodiment has its advantages as it only requires a single air cylinder to engage the matrix. As noted above, for one alternative embodiment, each peeler assembly may be configured with a dedicated peeler assembly mount 28 associated with a dedicated air cylinder. For example, each peeler assembly (302*a*, 302*b*, 302*c*, 304*a*, 304*b*, and 304*c*) may be configured with a dedicated peeler assembly mount 28 that is selectably associated with an air cylinder. Such a configuration while more complex allows an electronic controller or human operator to activate individual peeler assemblies.

Similarly, another alternative embodiment includes a configuration where the peeler assembly arrays are configured to be associated with a peeler assembly mount 28 that is associated with an air cylinder. For example, for the configuration depicted in FIG. 6, peeler assemblies 302*a*, 302*b*, and 302*c* may be configured with a first peeler assembly mount 28 associated with a dedicated air cylinder. Similarly, peeler assemblies 304*a*, 304*b*, and 304*c* may be configured with a second peeler assembly mount 28 associated with a dedicated air cylinder.

As described above for machine 10, machine 210 may further comprise peeler guide 126. For the embodiment depicted in FIG. 6, there may be three horizontal peeler guides or there may be two vertical peeler guides. For example, for the horizontal peeler guide configuration, a first peeler guide 126 defines a bar defining a guide width 153 wherein said bar extends from, and in alignment with, the left most peeler assembly 304*c* to the right most peeler assembly 302*c*. A similar second guide is used for peeler assemblies 302*b* and 304*b* as well as a third used for peeler assemblies 302*a* and 304*a*.

For the vertical peeler guide configuration, a first peeler guide 126 defines a bar defining a guide width 153 wherein said bar extends from, and in alignment with the uppermost peeler assembly 302*a* to the lowermost peeler assembly 302*c*. Similarly, a second peeler guide 126 defines a bar defining a guide width 153 wherein said bar extends from, and in alignment with the uppermost peeler assembly 304*a* to the lowermost peeler assembly 304*c*.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An improved apparatus for removing labels from the outside surface of a container, said apparatus comprising:

a frame;

a rotary platform movably associated with said frame wherein said platform is configured for receiving a first end of a cylindrically shaped container;

a rotary idler movably associated with said frame wherein said rotary idler is adjacent to and in alignment with said rotary platform, said rotary idler configured to receive and rotatably clamp an opposing second end of said cylindrically shaped container between said rotary idler and said rotary platform thereby defining a container void between said rotary platform and said rotary idler;

a rotary movement generator mechanically associated with said housing and said rotary platform, said rotary movement generator configured to generate and transfer a rotating force to said rotary platform;

a plurality of peeler assemblies wherein each peeler assembly comprises a peeler and wherein each peeler assembly is movably associated with said frame so that each peeler assembly is outside of said container void when not actuated and moves toward said container void when actuated; and a peeler assembly actuator configured for moving at least one peeler assembly a predefined distance toward said container void wherein said predefined distance is adjustable and selected so that the peeler of the at least one actuated peeler assembly comes into contact with a label associated with an outside surface of said cylindrically shaped container to spirally strip said label from said container; and wherein said plurality of peeler assemblies are in alignment along a predefined peeler-axis and wherein said apparatus further comprises a peeler guide defining a guide width, wherein said peeler guide extends along said peeler-axis from a first peeler assembly to a last peeler assembly and wherein said peeler guide further defines a peeler-assembly-bay at each peeler assembly location, wherein each peeler assembly is configured to retract within its respective peeler-assembly-bay when not engaging in a label removing process thereby providing at least one of a cleaning function and a safety function.

2. An improved apparatus for removing labels from the outside surface of a container as in claim 1, wherein said peeler is a blade defining a cutting edge and wherein the measure of said degree of rotation of said cutting edge from the horizontal position defines a z-axis tilt and wherein said z-axis tilt is between 1 and 15 degrees.

3. An improved apparatus for removing labels from the outside surface of a container as in claim 2, wherein each peeler assembly further comprises a peeler interface that is associated with a shaft, wherein said shaft is mechanically associated with an adjustable shaft receiver, said adjustable shaft receiver associated with a peeler assembly mount that is selectively mechanically associated with said peeler assembly actuator.

4. An improved apparatus for removing labels from the outside surface of a container as in claim 1, wherein said peeler is a blade defining a cutting edge and wherein the measure of said degree of rotation of said cutting edge from the horizontal position defines a z-axis tilt and wherein said z-axis tilt is between 1 and 15 degrees.

5. An improved apparatus for removing labels from the outside surface of a container as in claim 1, wherein each of said peeler-assembly-bays is defined by:

a first-bay-wall that extends downward from the top surface of the peeler guide at a predefined distance from and adjacent to a peeler assembly to a first point that is a predefined distance below and adjacent to the peeler assembly;

a bay-floor that extends from said first point to a second point that is a predefined distance below and adjacent to the peeler assembly; and a second-bay-wall that extends from said second point back to said top surface at a point adjacent to said peeler assembly.

6. An improved apparatus for removing labels from the outside surface of a container as in claim 5, wherein at least one of said first-bay-wall and said second-bay-wall extend non-perpendicularly from the top surface of the guide to the bay-floor thereby defining a guide angle.

7. An improved apparatus for removing labels from the outside surface of a container as in claim 6, wherein said guide angle is between about 1 degrees and 10 degrees.

8. An improved apparatus for removing labels from the outside surface of a container as in claim 1, further comprising a plurality of rotary platforms and rotary idler pairs, and further comprising a plurality of peeler assemblies for each rotary platform/rotary idler pair thereby forming a peeler matrix.

9. An improved apparatus for removing labels from the outside surface of a container, said apparatus comprising:

a frame;

a plurality of rotary platforms movably associated with said frame wherein each of said platform is configured for receiving a first end of a cylindrically shaped container;

a plurality of rotary idlers movably associated with said frame wherein each rotary idler is adjacent to and in alignment with one of said rotary platforms thereby defining a rotary platform-rotary idler pair wherein each of said rotary idlers is configured to receive and rotatably clamp an opposing second end of said cylindrically shaped container between said rotary idler its respective rotary platform thereby defining a container void between said rotary platform-rotary idler pair;

a rotary movement generator mechanically associated with said housing and each of said rotary platforms, said rotary movement generator configured to generate and transfer a rotating force to each rotary platform;

a plurality of peeler assemblies defining a peeler assembly array for each rotary platform-rotary idler pair, wherein each peeler assembly comprises a peeler and wherein each peeler assembly is movably associated with said frame so that each peeler assembly is outside of said container voids when not actuated and moves toward a container void when actuated;

a peeler assembly actuator configured for moving at least one peeler assembly a predefined distance toward a container void wherein said predefined distance is adjustable and selected so that the peeler of said at least one actuated peeler assembly comes into contact with a label associated with an outside surface of said cylindrically shaped container, placed in a container void, to spirally strip said label from said container; and wherein the peeler assemblies in each peeler assembly array are in alignment along a predefined peeler-axis and wherein said apparatus further comprises a peeler guide for each peeler assembly array, wherein each of said peeler guides extends along its respective peeler-axis from a first peeler assembly to a last peeler assembly and wherein each of said peeler guides further define a peeler-assembly-bay at each peeler assembly location, and wherein each peeler assembly is configured to retract within its respective peeler-assembly-bay when not engaging in a label removing process thereby providing at least on of a cleaning function and a safety function.

10. An improved apparatus for removing labels from the outside surface of a container as in claim 9, wherein said peeler is a blade defining a cutting edge and wherein the measure of said degree of rotation of said cutting edge from the horizontal position defines a z-axis tilt and wherein said z-axis tilt is between 1 and 15 degrees.

11. An improved apparatus for removing labels from the outside surface of a container as in claim 9, wherein said peeler assembly arrays define a peeler assembly matrix and wherein each peeler assembly further comprises a peeler interface that is associated with a shaft, wherein said shaft is mechanically associated with an adjustable shaft receiver, said adjustable shaft receiver associated with a peeler assembly mount that is selectively mechanically associated with said peeler assembly actuator.

12. An improved apparatus for removing labels from the outside surface of a container as in claim 9, wherein each of said peelers is a blade defining a cutting edge and wherein the measure of said degree of rotation of said cutting edge from the horizontal position defines a z-axis tilt and wherein said z-axis tilt is between 1 and 15 degrees.

13. An improved apparatus for removing labels from the outside surface of a container as in claim 9, wherein at least one surface of each peeler-bay defines a guide angle that provides a reference to set a z-axis tilt.

14. An improved apparatus for removing labels from the outside surface of a container as in claim 13, wherein said guide angle is between about 1 degrees and 10 degrees.

* * * * *